US011347465B2

(12) United States Patent
Aghababyan

(10) Patent No.: US 11,347,465 B2
(45) Date of Patent: May 31, 2022

(54) DISPLAY DEVICE ARRAY

(71) Applicant: Disney Enterprises, Inc., Burbank, CA (US)

(72) Inventor: Andranik Aghababyan, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/216,050

(22) Filed: Jul. 21, 2016

(65) Prior Publication Data

US 2018/0024800 A1 Jan. 25, 2018

(51) Int. Cl.
*G06F 3/14* (2006.01)
*G09G 5/14* (2006.01)
*G09G 5/00* (2006.01)

(52) U.S. Cl.
CPC ........... *G06F 3/1446* (2013.01); *G09G 5/005* (2013.01); *G09G 5/14* (2013.01); *G09G 2340/14* (2013.01); *G09G 2356/00* (2013.01); *G09G 2370/022* (2013.01); *G09G 2370/042* (2013.01); *G09G 2370/06* (2013.01); *G09G 2370/16* (2013.01)

(58) Field of Classification Search
CPC ........ G06F 3/1446; G09G 5/14; G09G 5/005; G09G 2370/022; G09G 2370/06
See application file for complete search history.

(56) References Cited

U.S. PATENT DOCUMENTS

| | | | |
|---|---|---|---|
| 2013/0176255 A1* | 7/2013 | Kim | G06F 3/01 345/173 |
| 2014/0089388 A1* | 3/2014 | Curry | G06F 3/1423 709/203 |
| 2014/0293017 A1* | 10/2014 | Fei | G09F 9/3026 348/51 |
| 2014/0355819 A1* | 12/2014 | Naruse | G06F 3/1423 382/103 |
| 2015/0084837 A1* | 3/2015 | Mese | G06F 3/1446 345/1.3 |
| 2015/0134456 A1* | 5/2015 | Baldwin | H04W 8/18 705/14.64 |
| 2015/0279037 A1* | 10/2015 | Griffin | G06F 3/1446 345/1.3 |
| 2016/0093271 A1* | 3/2016 | Cho | G06F 3/013 345/1.3 |
| 2016/0124930 A1* | 5/2016 | Dhawan | G06F 17/243 715/224 |

* cited by examiner

*Primary Examiner* — Kent W Chang
*Assistant Examiner* — Andrew Lee
(74) *Attorney, Agent, or Firm* — Patterson + Sheridan, LLP

(57) ABSTRACT

Systems and methods are provided that allow a display device array to be used to present content to one or more users. In particular, a user associated with a first user device, may opt to present content on a plurality of other devices. The plurality of other devices may be arranged in any desired configuration, and the first user device can capture the arrangement. Upon capturing the arrangement, content, under the control of the first user device, may be presented on the plurality of other devices in accordance with the arrangement.

22 Claims, 10 Drawing Sheets

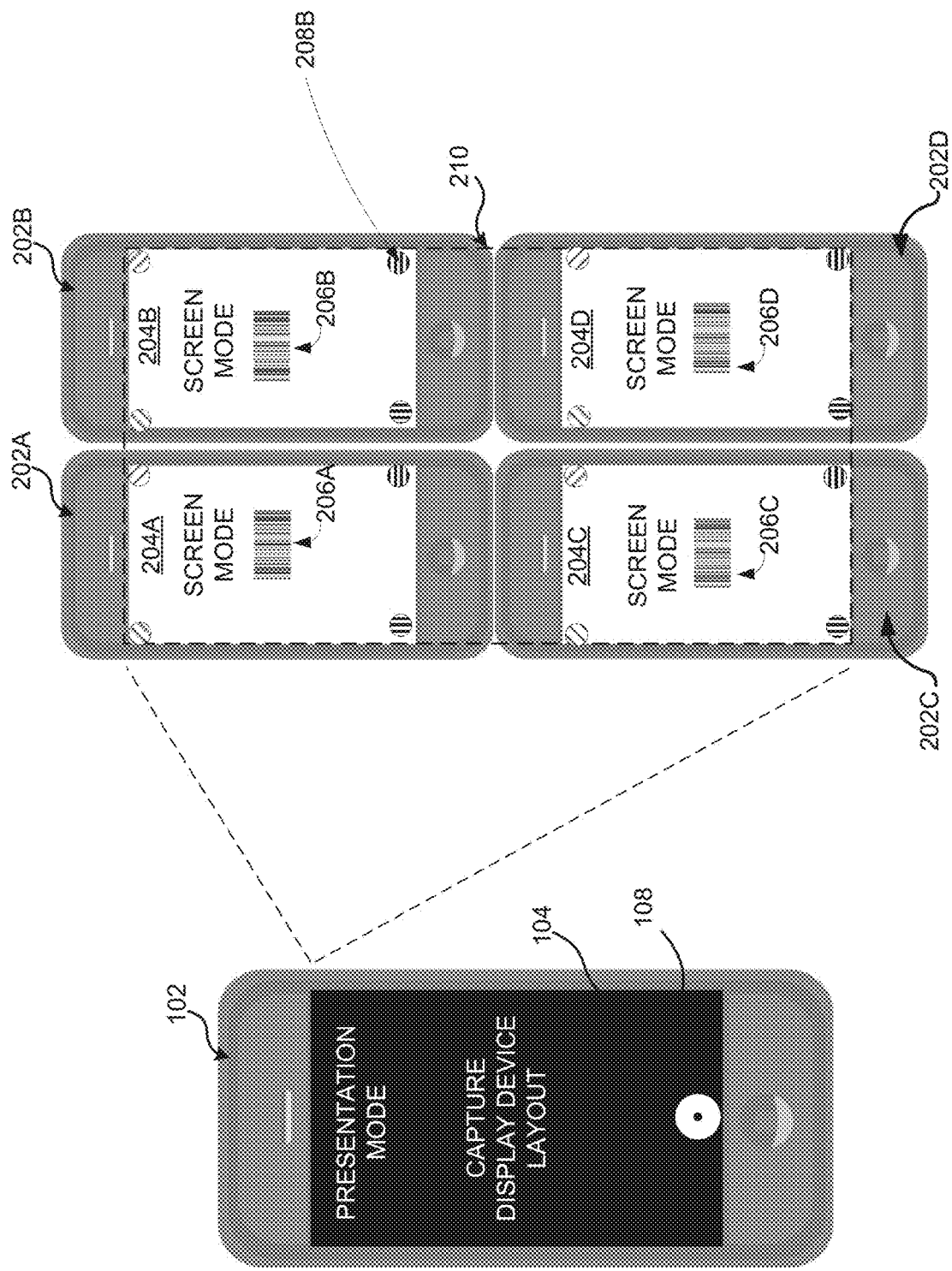

Present a device identifier on each of a plurality of display devices oriented into a display device array
400

Present at least one orientation identifier on each of the plurality of display devices
402

Receive at least one portion of content to be displayed on the display device array commensurate with an orientation of the display devices of the display device array that is determined based upon the device identifier and the at least one orientation identifier of each of the plurality of display devices
404

FIG. 4

DISPLAY DEVICE ARRAY

TECHNICAL FIELD

The present disclosure relates generally to the display of media content.

DESCRIPTION OF THE RELATED ART

Displays are often implemented as part of user devices, such as smartphones, tablet personal computers (PCs), laptop computers, smartwatches, and the like. Content, such as videos, pictures, and electronic documents may be presented on such displays.

BRIEF SUMMARY OF THE DISCLOSURE

In accordance with one embodiment, a computer-implemented method for presenting content on a screen device array comprises receiving an image of the display device array, and analyzing the image to determine a relative position of each display device of the display device array and size of each display device. Furthermore, the computer-implemented method comprises transmitting at least one portion of content to be displayed to each display device of the display device array based upon the relative position of each display device and the size of each display device.

In accordance with another embodiment, a computer-implemented method for presenting content on a screen device array comprises presenting a device identifier on each of a plurality of display devices oriented into a display device array, and presenting at least one orientation identifier on each of the plurality of display devices. The computer-implemented method further comprises receiving at least one portion of content to be displayed on the display device array commensurate with an orientation of the display devices of the display device array that is determined based upon the device identifier and the at least one orientation identifier of each of the plurality of display devices.

In accordance with yet another embodiment, a system comprises a presentation device adapted to capture an image representative of an array of display devices upon which content is to be displayed. Additionally, the system comprises a plurality of display devices comprising the array of display devices adapted to receive at least one portion of the content, wherein the at least one portion of the content to be displayed on each of the plurality of display devices is determined based upon relative positioning and sizes of each of the plurality of display devices.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2A illustrates a presentation device capturing a display device array in accordance with one embodiment of the present disclosure.

FIG. 4 is a flow chart illustrating example operations performed by at least one display device of a display device array to display content on the display device array in accordance with one embodiment of the present disclosure.

The figures are not exhaustive and do not limit the present disclosure to the precise form disclosed.

DETAILED DESCRIPTION

Displays can be configured to present a variety of content types, including advertisements, audio/visual content, still images, electronic documents, web content, etc. For example, a user of a smartphone on which such a display is implemented, may view content that is downloaded, streamed, or otherwise accessible to that smartphone. However, the presentation of content on a mobile device is limited by the size of the mobile device display screen, and there is no collaboration or sharing (with other devices) when it comes to presenting the content.

It should be noted that content may be projected or sent to an array of monitors or screens, such as when a media player is operatively connected to multiple display monitors, or when a computer processing unit (CPU) is operatively connected to multiple computer monitors. However, the target array of monitors or screens in such scenarios is controllable only by way of a resident display configuration control that can sense parameters or characteristics of each of the monitors or screens by virtue of their connection to the media player, CPU, etc. Thus the target array of monitors or screens cannot be dynamically arranged/configured. Moreover, such arrays are often limited to dedicated monitors or screens, i.e., such arrangements are not generally utilized with mobile device displays.

Accordingly, various embodiments described in the present disclosure provide systems and methods by which a display device array can be used to present content to one or more users. In particular, a user associated with a first user device, may opt to present content on a plurality of other devices. The plurality of other devices may be arranged in any desired configuration, and the first user device can capture the arrangement. Upon capturing the arrangement, content, under the control of the first user device, may be presented on the plurality of other devices in accordance with the arrangement. Content in the present disclosure can be any type of media content, including but not limited to movies, broadcast TV shows, online videos, user-created videos, music, images, video games, electronic documents, content on a webpage, and the like. Moreover, the content can be accessed or originate from one or more broadcast entities, media content servers, personal devices, etc.

Figure 1:
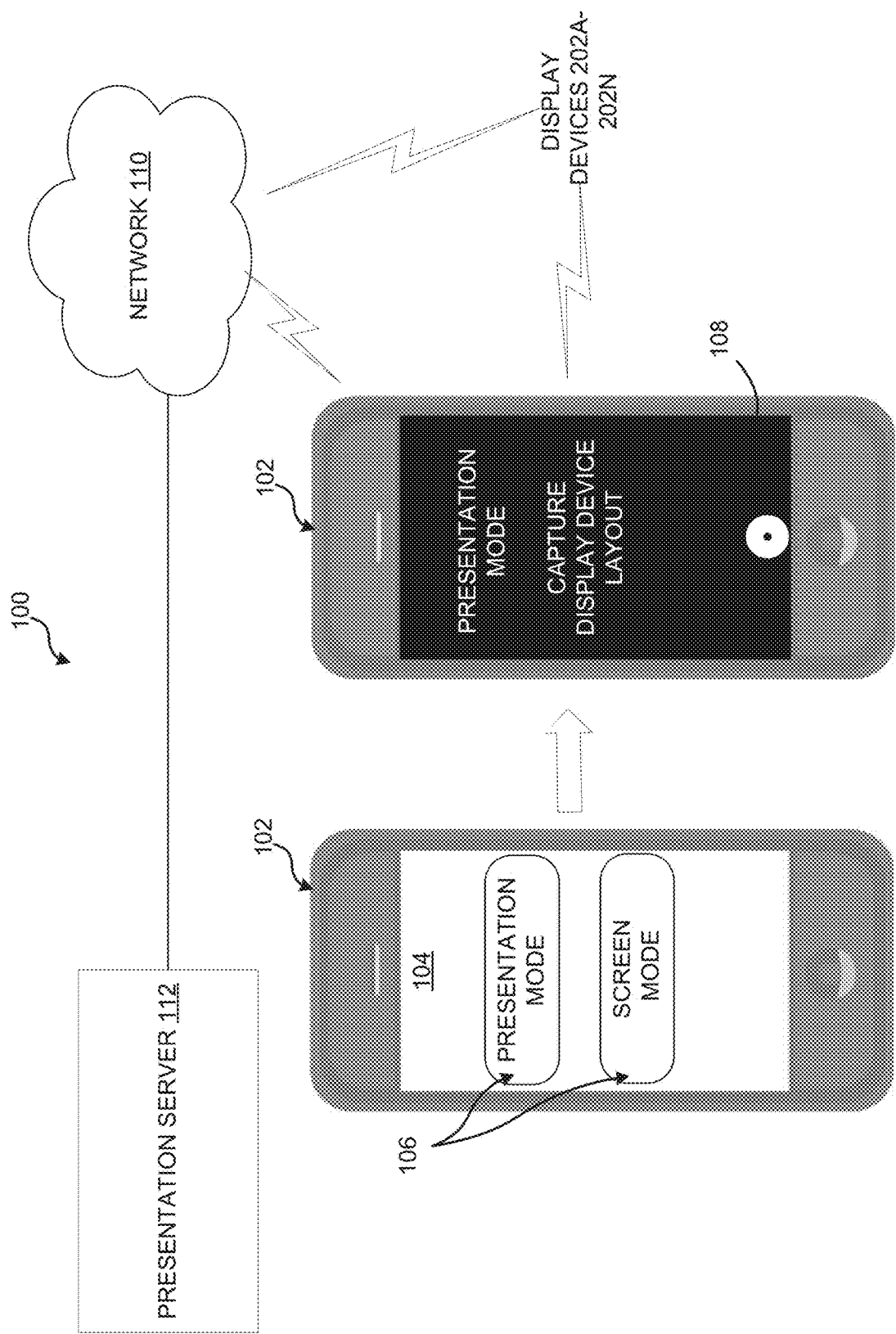
FIG. 1 illustrates an example environment in which various embodiments may be implemented.

FIG. 1 is a diagram illustrating an example system 100 in which various embodiments can be implemented, and will be described in conjunction with FIG. 3, which illustrates capturing characteristics of a display device array from a presentation device perspective. System 100 may include a first user device 102. First user device 102 may be considered the presentation device on behalf of which content will be displayed on a display device array. The display device array may comprise one or more display devices 202A-202N. In some embodiments multiple devices may be utilized to display content. In some embodiments, a user may wish to present content from a smaller user device, e.g., a smartphone, on a larger user device, e.g., a tablet PC.

As illustrated in FIG. 1, first user device 102 may be a smartphone with a display 104 on which options 106 to act as a presentation device (presentation mode) or a display device (screen mode) can be offered to a first user of first user device 102. Should the first user select the option to enter into a presentation mode, first user device 102 enables a resident camera function or application to allow an image of the display device array to be captured. That is, the first user may actuate shutter button 108 to take a picture or image of the display device array. It should be noted that first user device 102 may also be a tablet PC, a smartphone, a laptop PC, a smartwatch, or some alternative form of media accessing or presentation device.

Figure 3:
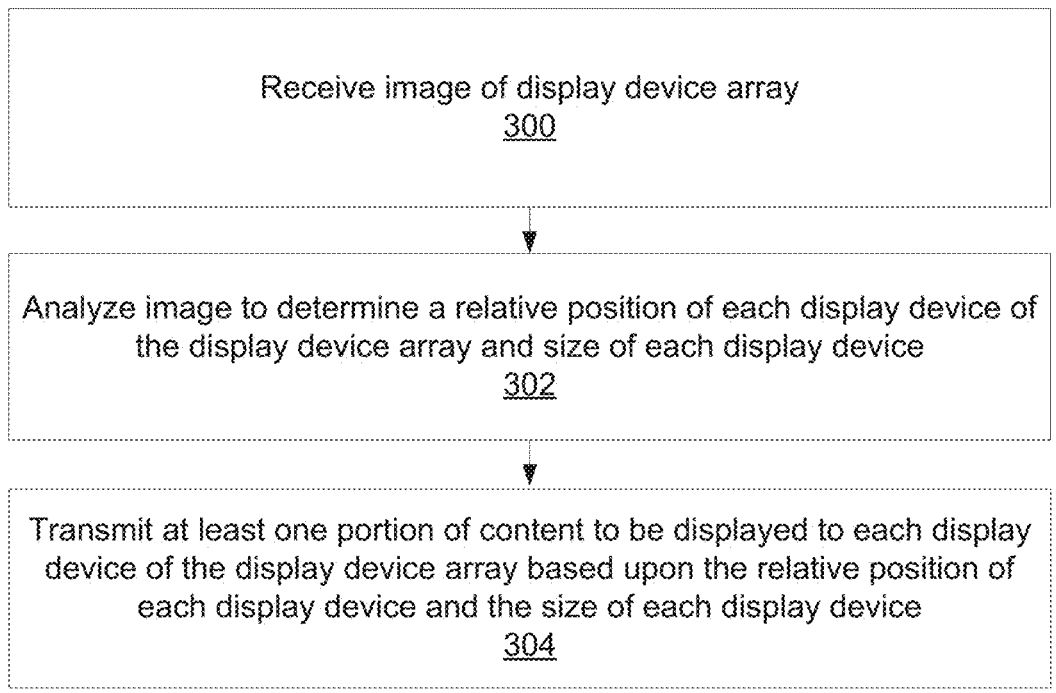
FIG. 3 is a flow chart illustrating example operations performed by a presentation device or back-end server to display content on a display device array in accordance with one embodiment of the present disclosure.

Referring to FIG. 3, an image of the display device array is received subsequent to the capturing of the picture or image of the display device array at operation 300. In accordance with one embodiment, the image may be captured by the resident camera function or application of first user device 102 and received by a presentation application implemented on first user device 102. In accordance with another embodiment, the image may be captured by the resident camera function or application of first user device 102 and received by a presentation server 112.

Communications between first user device 102, presentation server 112, and/or user display devices 202A-202N, which comprise a display device array, can be effectuated over a network 110. Network 110 may be any cable, wire, and/or wireless communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 110 may employ various communication media, such as a coaxial cable, fiber optic cable system, Ethernet, radio waves, etc.

In either embodiment, the captured image is utilized to determine the characteristics of the display device array to which content to be presented will be transmitted. That is, and at operation 302, the image is analyzed to determine a relative position of each display device of the display device array and size of each display device. For example, the presentation application of the first user device 102 or the presentation server 112 may use an appropriate image analyzation software or application to detect certain identifiers associated with each display device 202A-202N of the display device array which appear as part of the captured image.

At operation 304, at least one portion of the content to be displayed is transmitted to each display device of the display device array based upon the relative position of each display device and the size of each display device. In some embodiments, upon determining how the content to be displayed on the display device array is to be deconstructed for presentation on each display device, the presentation server 112 or the presentation application resident on first user device 102 may first fragment or partition the content. Subsequently, the presentation server 112 or the presentation application resident on first user device 102 may then transmit each fragment or portion to each appropriate display device for presentation.

In some embodiments, the presentation server 112 or the presentation application resident on first user device 102 may determine how to fragment the content. Subsequently, the presentation server 112 or the presentation application resident on first user device 102 may transmit the entirety of the content to each display device for presentation along with instructions, e.g., in the form of attached or embedded metadata. These instructions indicate to each display device, what portion of the content should be presented by a particular display device of the display device array.

In some embodiments, first user device 102 and user devices 202A-202N may be operating in a collaborative session via a cloud storage service or application. That is, first user device 102 and user devices 202A-202N may each be logged into a cloud storage service, such as one provided by presentation server 112, and running an associated presentation application for viewing content stored on presentation server 112. Alternatively still, first user device 102 and user devices 202A-202N may be engaged in a collaborative session via a cloud or network-based whiteboard application or service, which again may be provided by presentation server 112. A session ID may be used to identify a particular collaborative session, which in turn, can be used to also identify the user devices involved in the collaborative session by virtue of their association with a particular session ID.

Accordingly, upon receiving the content to be displayed on the display device array at each of user devices 202A-202N, each of user devices 202A-202N can use the captured image of the array and knowledge of its position in the array to determine, on their own, the portion of the content to present in one embodiment. Because first user device 102 and user devices 202A-202N are engaged in a collaborative session, individualized instructions or pre-fragmented/pre-partitioned content need not be transmitted to user devices 202A-202N in this embodiment. That is, user devices 202A-202N can determine what portion of the content is to be presented thereon vis-à-vis the collaborative session. In one embodiment, user device 102 captures a picture of all participating user devices 202A-202N which can then be transmitted to presentation server 112. Presentation server 112 can analyze the picture and identify all user devices 202A-202N participating in that given session and their relative positions with respect to the content. Presentation server 112 sends this information back to user device 102. At the same time, each of user devices 202A-202N were in screen mode can be waiting for a response from presentation server 112. Presentation server 112 sends a session ID and information regarding their own position to each of user devices 202A-202N. In accordance with one embodiment, the content can be pushed to or pulled by each of user devices 202A-202N from presentation server 112 as a whole and each one of user devices 202A-202N can present their respective portion of the content based on their position information.

In some embodiments, first user device 102 and user devices 202A-202N may reside on the same network, e.g., a local WiFi network, a cellular network, etc. In this case, first user device 102 may transmit content fragments or partitions, the content along with the requisite instructions, or a location, such as a URL, of the content to each of user devices 202A-202N. If first user device 102 is operating on a different network than user devices 202A-202N, presentation server 112 can be used to transmit the content fragments, content location, etc. to user devices 202A-202N. It should be noted that in any of the embodiments described herein, it is contemplated that the operation(s) for presenting content can be repeated as needed, such as for example, if the first user wishes to change the content to be presented.

Figure 2B:
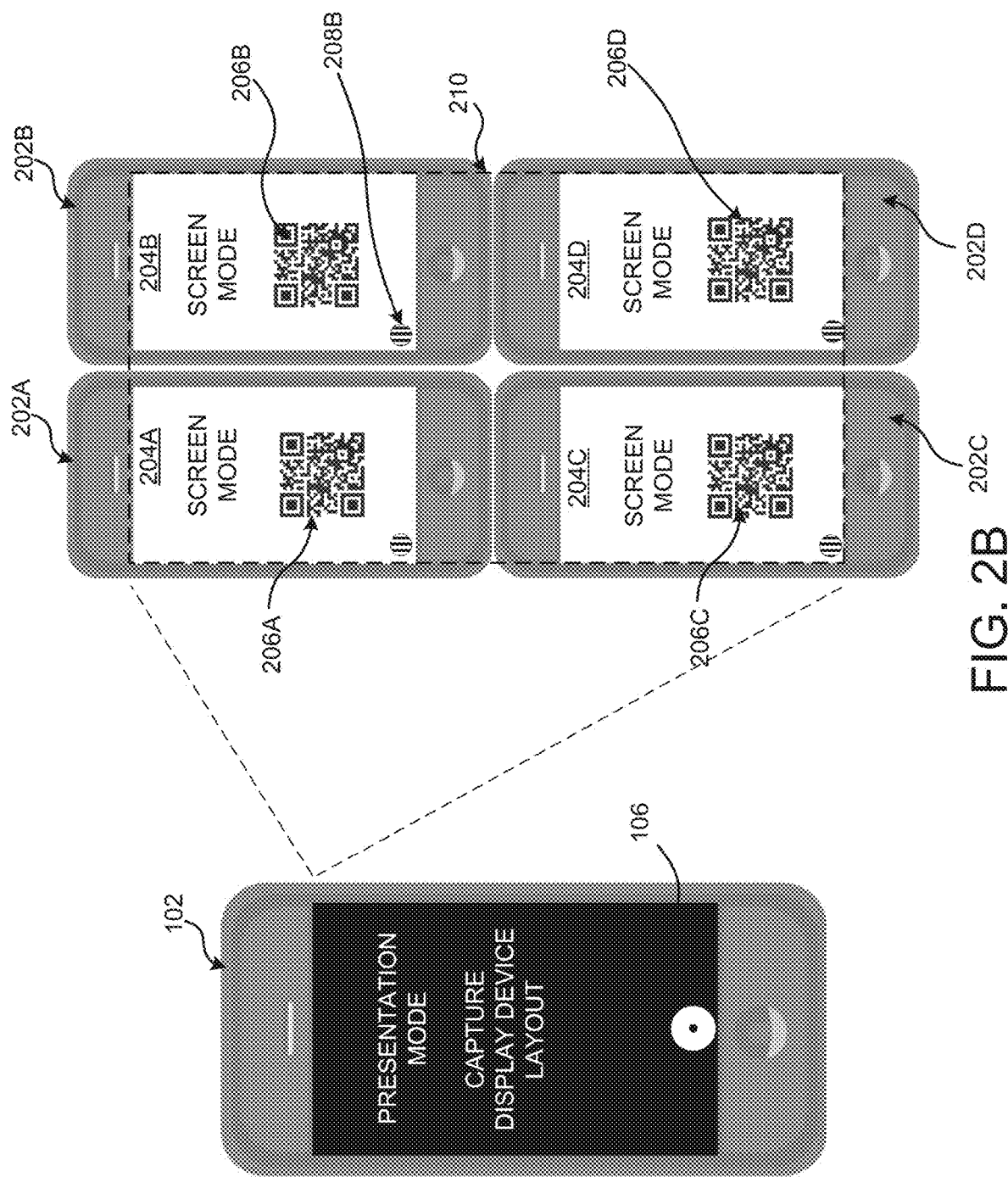
FIG. 2B illustrates a presentation device capturing a display device array in accordance with another embodiment of the present disclosure.

FIGS. 2A and 2B illustrate examples of capturing the display device array configuration in accordance with various embodiments, and will be described in conjunction with FIG. 4, a flow chart illustrating operations performed for presenting content in a display device array from the perspective of the display devices making up the display device array.

FIG. 2A illustrates one example of first user device 102 capturing an image of a display device array. In FIG. 2A, the display device array comprises other user devices 202A, 202B, 202C, and 202D. Each of user devices 202A-202D may be any one of a smartphone, a tablet PC, a smartphone, a laptop PC, a smartwatch, or some alternative form of media accessing or presentation device. As described previously, the user of first user device 102 may wish to present content to a plurality of other users on a display that is larger than display 104 of first user device 102. Hence, the other users' respective user devices 202A-202D can be oriented to configure a display device array. In the example illustrated in FIG. 2A, user devices 202A-202D may be oriented in a manner such that the respective displays 204A-204D of user devices 202A-202D form a rectangular display device array bounded by a border 210.

FIG. 2A further illustrates certain identifiers indicative of the display characteristics of each of displays 204A-204D of user devices 202A-202D in accordance with some embodiments. Referring to FIG. 4, at operation 400, a device identifier is presented on each of a plurality of display devices oriented into a display device array. In this embodiment, each of user devices 202A-202D displays a unique code, 206A-206D on their respective displays 204A-204D. The unique code may be a bar code or other indicia capable of identifying each one of user devices 202A-202D.

In one embodiment, following the example discussed above, where first user device 102 and user devices 202A-202D are engaged in a collaborative session, first user device 102 and user devices 202A-202D may enable their respective presentation applications. Upon user devices 202A-202D opting to enter into screen mode, the unique code corresponding to each of user devices 202A-202D may be transmitted from presentation server 112 to the appropriate user device.

It should be appreciated that prior to engagement in a collaborative session, each of user devices 202A-202D may have registered with presentation server 112. In this way, presentation server 112 may become informed of each user device's specific parameters, such as one or more of the model, type, brand, screen dimensions (of the display screen and/or the entire display device), and other relevant characteristics. In other embodiments, the unique code may be an international mobile equipment identifier (IMEI), an international mobile subscriber identity (IMSI), a corresponding Internet protocol (IP) address, or other indicia. Moreover, the presentation application resident on first user device 102 or presentation server 112 may access another data repository to identify user devices 202A-202D based on their unique code. Accordingly, and referring back to operation 302 of FIG. 3, where a captured image of the display device array is analyzed to determine a relative position of each display device of the display device array and size of each display device, the analysis is based upon the unique ID 206A-206D of each user device 202A-202D. In this way, the content to be displayed can be fragmented or partitioned in a manner that "fits" the dimensions of each user device 202A-202D.

It should be noted that in some embodiments, other sensing techniques may be utilized, where the image analyzation can recognize distinguishing features of a particular user device, e.g., placement and shape of a home button on a smartphone or tablet PC, which can be enough to determine the brand and model of smartphone or tablet PC. Accordingly, at least some of the aforementioned parameters that would be registered with the presentation server 112 may be skipped. That is, presentation server 112 may be populated with or have access to a data repository containing the dimensions of existing user devices. If each of user devices 202A-202D are determined to be Apple iPhone® 6s, the dimensions can be determined without accessing information registered with the user devices.

Referring back to FIG. 4, at least one orientation identifier is presented on each of the plurality of display devices at operation 402. For example, as illustrated in FIG. 2A, orientation identifiers are presented on displays 204A-204D (one example of which is orientation identifier 208B). In the example of FIG. 2A, each of user devices 202A-202D displays four orientation identifiers, one in each corner of each respective display 204A-204D. These orientation identifiers can be colored dots, e.g., a green dot for the top left corner of a display, a red dot for the top right corner, a blue dot for the bottom left corner, and a yellow dot for the bottom right corner. Although the orientation identifiers are distinguished in this example using color, other distinguishers may be used, such as varied shading, varied shapes, patterns or any other visually-based distinguisher. Moreover, although the orientation identifiers are presented in the corners of a display, they may be presented in other areas as well. In this way, the orientation of each of user devices 202A-202D relative to each other can be determined. For example, the captured image can reveal that the top and bottom right corners of user device 202A are located substantially, horizontally parallel to top and bottom left corners of user device 202B suggesting that the display device array includes user device 202A oriented next to user device 202B. The orientation of user devices 202A and 202B relative to user devices 202C and 202D, as well as the orientation of user device 202C to 202D can be determined in a similar manner. Upon determining the relative orientation of all user devices present in the captured image, a border 210 can be defined and used as a guideline for determining how the content to be displayed should be fragmented. For example, the content to be presented on the display device array can be partitioned into rectangular sections made to fit into the respective displays 204A-204D of user devices 202A-202D. Accordingly, at operation 404, each display device receives at least a portion of content to be displayed on the display device array. The portion is commensurate with an orientation of the display devices of the array that is determined based upon the unique identifier and the orientation identifier(s) of each display device.

FIG. 2B illustrates another example of first user device 102 capturing an image of a display device array. In FIG. 2B, the display device array again comprises other user devices 202A, 202B, 202C, and 202D. Each device 202A-202D may be any one of a smartphone, a tablet PC, a smartphone, a laptop PC, a smartwatch, or some alternative form of media accessing or presentation device. As described previously, the user of first user device 102 may wish to present content to a plurality of other users on a display that is larger than display 104 of first user device 102. Hence, the other users' respective user devices 202A-202D can be oriented to configure a display device array. In the example illustrated in FIG. 2B, user devices 202A-202D may be oriented in a manner such that the respective displays 204A-204D of user devices 202A-202D form a rectangular display device array bounded by a border 210.

However, and in contrast to the example illustrated in FIG. 2A, user devices 202A-202D of FIG. 2B present a unique code in the form of a OR code. Additionally, instead of presenting four orientation identifiers in each corner of each display, displays 204A-204D of user devices 202A-202D each present a single orientation identifier 208B. Although additional calculations may be performed, the presentation application resident on first user device 102 or the image analyzation software on presentation server 112 can still determine the relative position and orientation of each of user devices 202A-202D and determine the boundaries of the display area bounded by border 210. For example, based on knowledge that each user device presents an orientation identifier in its bottom left corner, it can be determined that if an orientation identifier is determined to be in the bottom left corner of a device display, the device display is in its "normal" portrait orientation. With the determination that an orientation identifier of user device 202B is positioned to the right and substantially "in line" with that of user device 202A, it can be assumed that user devices 202A and 202B are next to each other and both oriented in their normal portrait orientation, and so on.

FIGS. 5-8 illustrate various example orientations of display device arrays and the presentation of content thereon.

Figure 5:
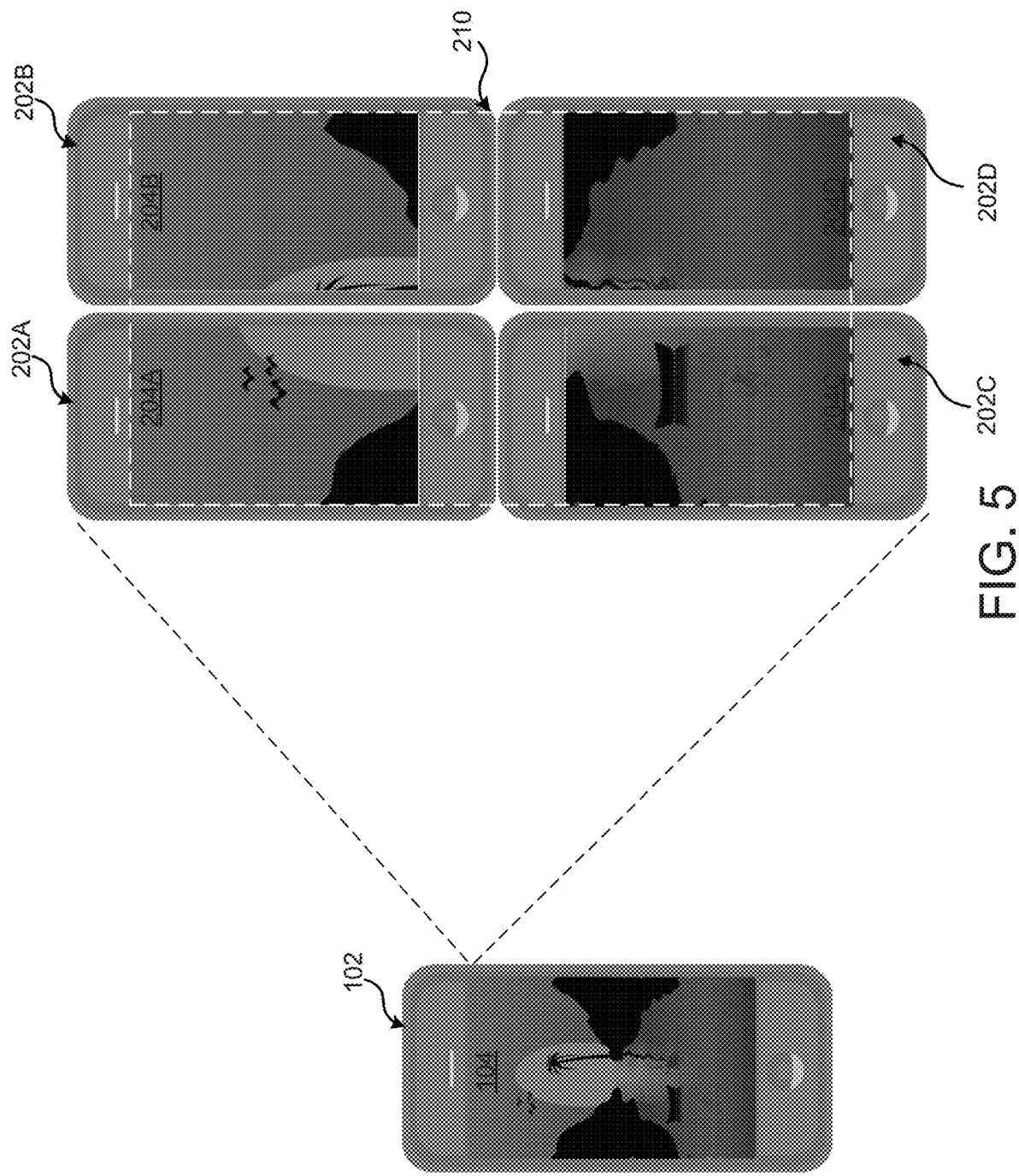
FIG. 5 illustrates an example of content presented on a display device array in accordance with a first embodiment of the present disclosure.

FIG. 5 illustrates one example of content presentation on a display device array, where display device array comprises user devices 202A-202D. In this example, the orientation of user devices 202A-202D allows for a portrait oriented presentation of content from user device 102. It should be noted that a user of first user device 102 may control aspects of how content is to be displayed on the display device array. In the example illustrated in FIG. 5, it can be seen that the content "fills" border 210. However, in other embodiments, the content may be scaled up or down, stretched, centered, rotated, flipped, etc. as desired.

Figure 6:
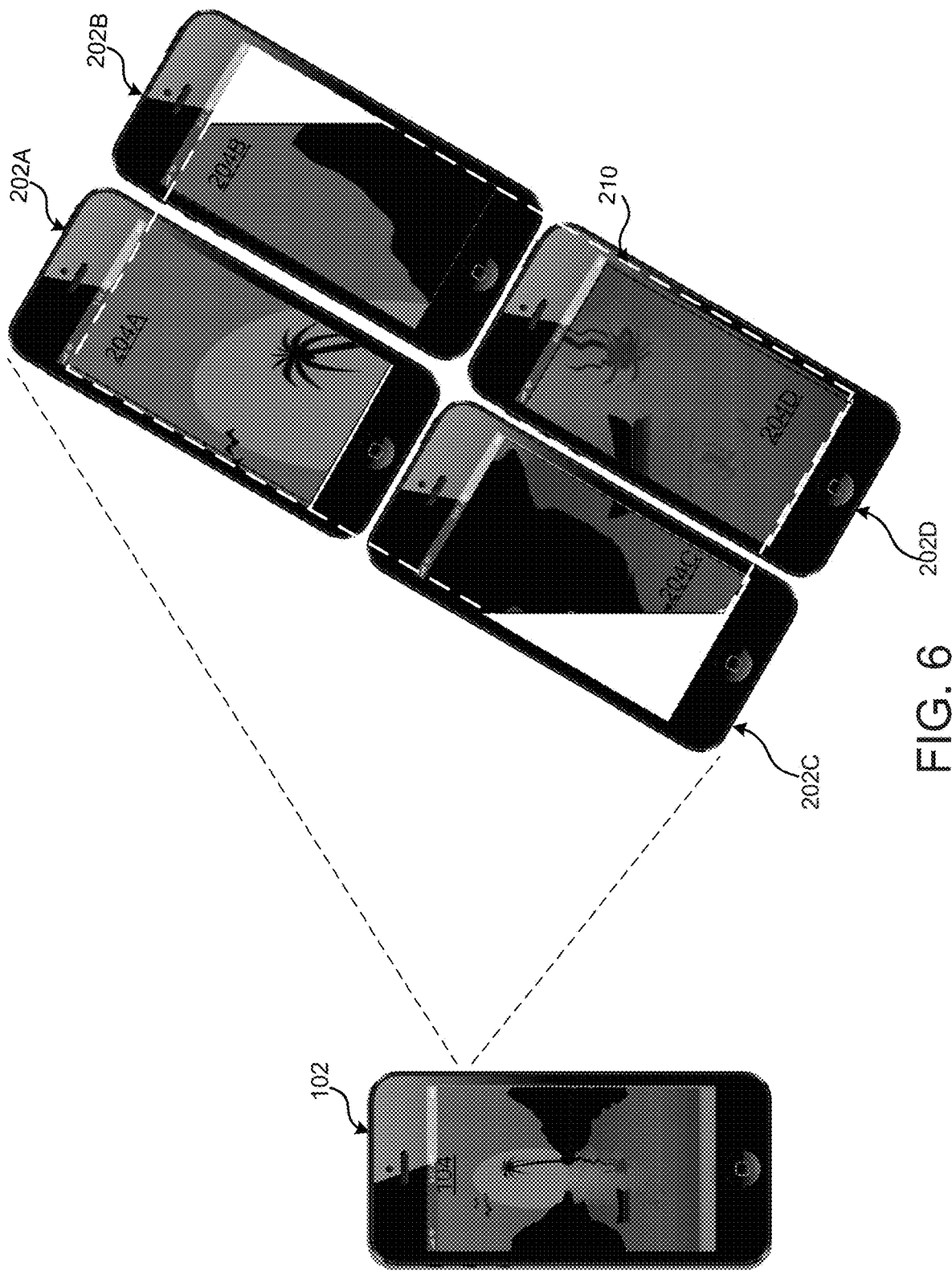
FIG. 6 illustrates an example of content presented on a display device array in accordance with a second embodiment of the present disclosure.
Figure 7:
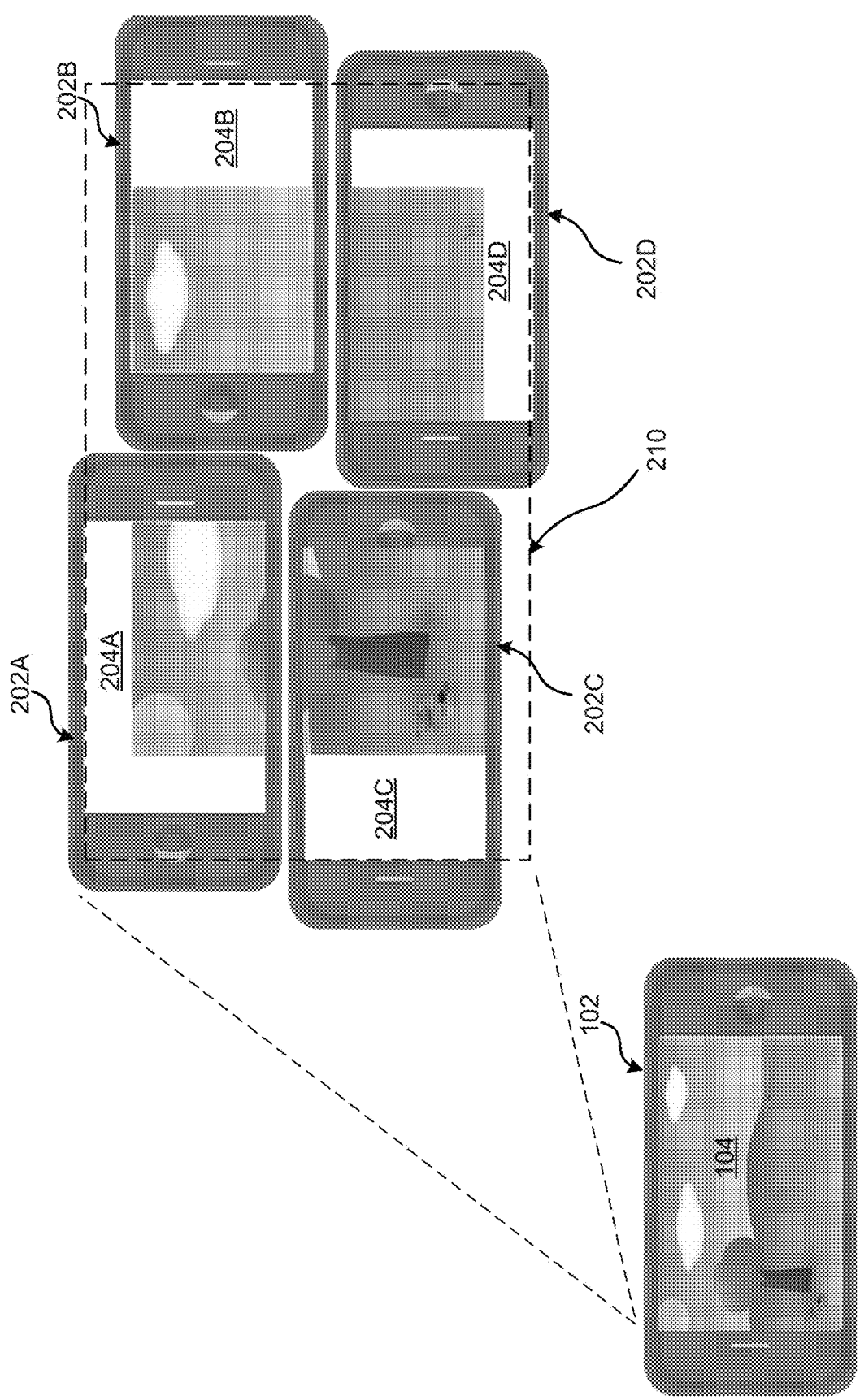
FIG. 7 illustrates an example of content presented on a display device array in accordance with a third embodiment of the present disclosure.

FIG. 6 illustrates another example of content presentation on a display device array. In this example, the orientation of user devices 202A-202D is the same or similar to that illustrated in FIG. 5. However, the display device array is canted. Because, as described previously, first user device 102 captures an image of the display device array, it is aware of the orientation of user devices 202A-202D and that the display device array is canted. The content is partitioned and adjusted accordingly, FIG. 7 illustrates another example of content presentation on a display device array. In this example, the orientation of user devices 202A-202D is shifted in comparison to that illustrated in FIG. 5. In the example illustrated in FIG. 7, user device 202B is positioned to the right of and slightly lower than user device 202A. User device 202C is positioned substantially parallel to user device 202A but below and slightly to the left. User device 202D is positioned slightly below and to the right of user device 202C and below and slightly to the left of user device 202B. Additionally, the content on user device 102 to be presented (shown in its "original" format on display 104), is scaled down such that the resulting presentation of content is smaller than boundary 210.

In the examples above, the image is partitioned and scaled taking into account that displays are not necessarily contiguous. That is, taking the presentation of content in FIG. 7, for example, it can be seen that the portion of content presented on display 204A of user device 202A ends where display 204A ends. Accordingly, one or more portions of the original content may not be displayed as a result of the housing and bezel, for example, of user devices. However, in some embodiments, the image analyzation software utilized in fragmenting the content to be presented may take such factors into consideration and shift, scale, or otherwise adjust the portions of content to be displayed such that the entirety of the content is presented.

Figure 8:
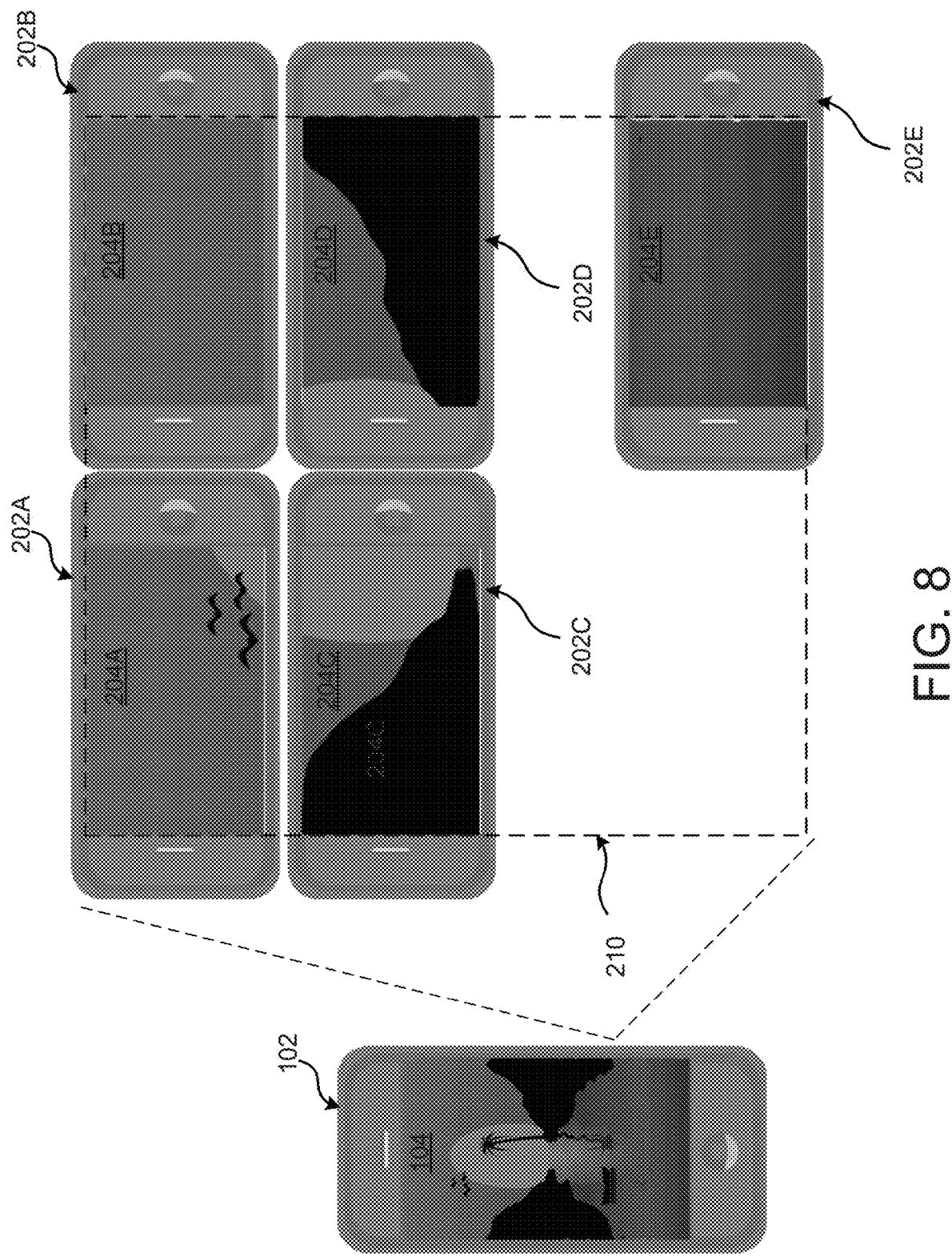
FIG. 8 illustrates an example of content presented on a display device array in accordance with a fourth embodiment of the present disclosure.

FIG. 8 illustrates another example of content presentation on a display device array. In this example, the orientation of user devices 202A-202D is a landscape orientation. Moreover, an additional user device 202E is included in the display device array. In this example, user device 202E is not contiguously positioned relative to the other user devices 202A-202D. Hence, the content to be displayed on the display device array may be fragmented in accordance with border 210 while taking into account the fact that some of the content will be left un-presented due to the non-contiguous orientation of user devices in the display device array. Further still, it can be appreciated that in this particular example, the content as displayed on the display device array has been stretched to reach the maximum boundary 210.

Figure 9:
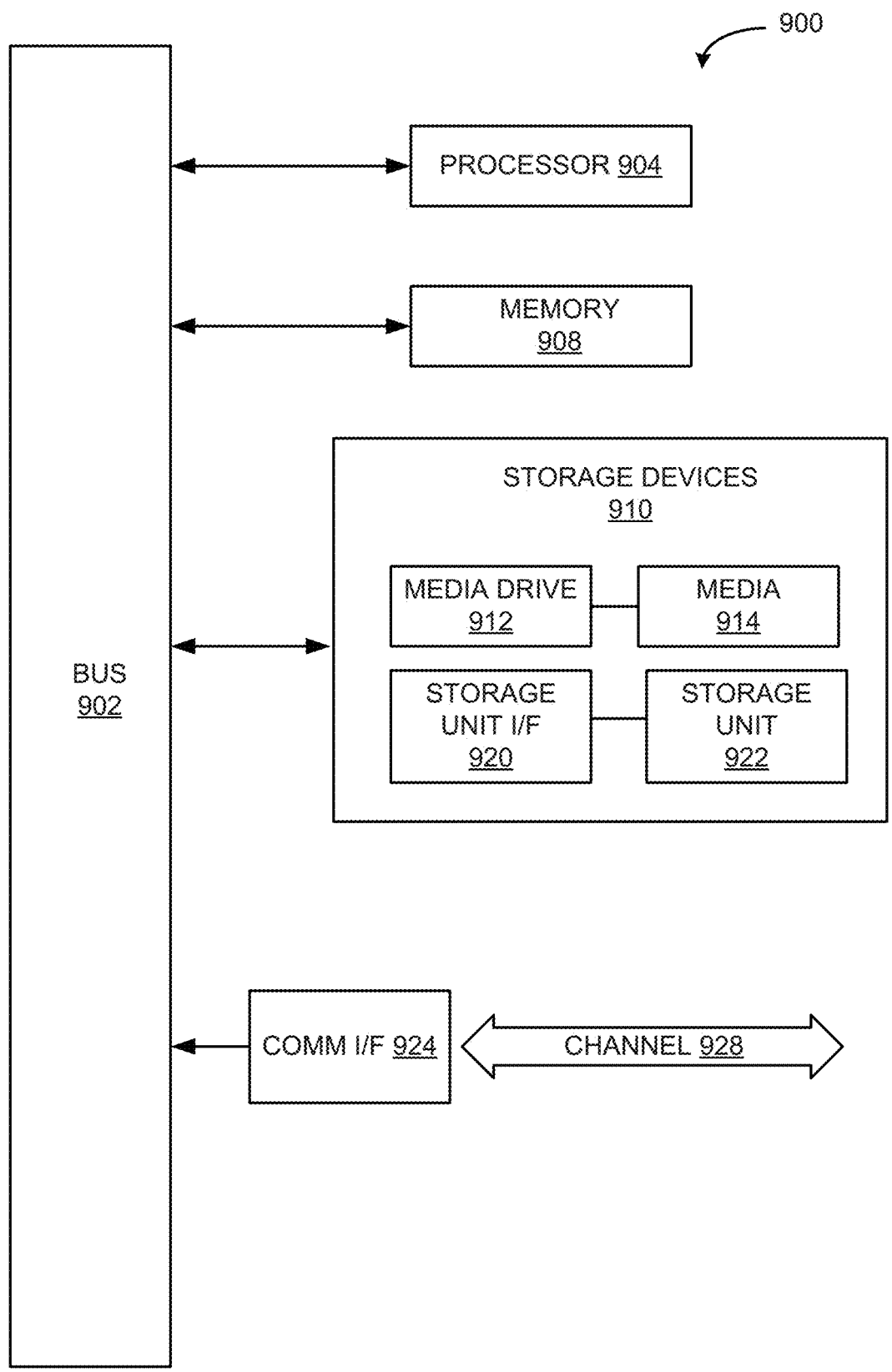
FIG. 9 is an example computing component that may be used to implement various features of embodiments described in the present disclosure.

As used herein, the term component or element might describe a given unit of functionality that can be performed in accordance with one or more embodiments of the present application. As used herein, a component or element might be implemented utilizing any form of hardware, software, or a combination thereof. For example, one or more processors, controllers, ASICs, PLAs, PALs, CPLDs, FPGAs, logical components, software routines or other mechanisms might be implemented to make up a component or element. In implementation, the various components or elements described herein might be implemented as discrete components or elements or the functions and features described can be shared in part or in total among one or more components or elements. In other words, as would be apparent to one of ordinary skill in the art after reading this description, the various features and functionality described herein may be implemented in any given application and can be implemented in one or more separate or shared components or elements in various combinations and permutations. Even though various features or elements of functionality may be individually described or claimed as separate components or elements, one of ordinary skill in the art will understand that these features and functionality can be shared among one or more common software and hardware elements, and such description shall not require or imply that separate hardware or software components are used to implement such features or functionality.

Where components or elements of the application are implemented in whole or in part using software, in one embodiment, these software elements can be implemented to operate with a computing or processing component capable of carrying out the functionality described with respect thereto. One such example computing component is shown in FIG. 9 which may be used to implement various features of the system and methods disclosed herein. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. For example, computing component 900 may be one embodiment of first user device 102, user devices 202A-202N, and/or one or more functional elements thereof. Computing component 900 might also represent computing capabilities embedded within or otherwise available to a given device. For example, a computing component might be found in other electronic devices such as, for example navigation systems, portable computing devices, and other electronic devices that might include some form of processing capability.

Computing component 900 might include, for example, one or more processors, controllers, control components, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing component 900 or to communicate externally.

Computing component 900 might also include one or more memory components, simply referred to herein as main memory 908. For example, preferably random access memory (RAM) or other dynamic memory might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 914 might include, for example, a hard disk, an integrated circuit assembly, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot, a PCMCIA slot and card, and other fixed or removable storage units 922 and interfaces 920 that allow software and data to be transferred from the storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method to display content, the computer-implemented method comprising:

performing, by a presentation server via a network, registration of one or more display devices of an array of display devices, wherein each display device of the array of display devices is configured to execute a presentation application in a screen mode responsive to selection of the screen mode from a plurality of selectable modes including the screen mode and a presentation mode;

receiving, by the presentation server via the network, an image captured by a presentation device executing the presentation application in the presentation mode responsive to selection of the presentation mode from the plurality of selectable modes, wherein the image is captured via a function accessed via the presentation mode, wherein the image depicts the array of display devices, and wherein the image further depicts a unique device identifier and an orientation identifier presented by each display device of the array of display devices via the screen mode;

associating, by the presentation server, the presentation device and the array of display devices with a session identifier corresponding to a collaborative session; and analyzing the image by the presentation server when executed by one or more computer processors to determine a relative position, an orientation, and a size of each display device of the array of display devices, including determining, based upon at least one of the registration or the unique device identifier presented by a respective display device, physical dimensions of at least a display screen of the respective display device;

wherein the presentation application executing in the screen mode on a first display device of the array of display devices is configured to generate and output, based upon the relative position, the orientation, and the size of the first display device, a first partition of the content without requiring any partition instruction from the presentation server.

2. The computer-implemented method of claim 1, wherein the presentation server is configured to provide a cloud-based presentation service.

3. The computer-implemented method of claim 1, further comprising determining, by the presentation server, positioning of the orientation identifier presented by the first display device relative to the orientation identifier presented by at least one other display device of the array of display devices.

4. A computer-implemented method to display content, the computer-implemented method comprising:

participating in registration of one or more display devices of an array of display devices via a presentation server over a network, wherein each display device of the array of display devices is configured to execute a presentation application in a screen mode responsive to selection of the screen mode from a plurality of selectable modes including the screen mode and a presentation mode;

presenting a unique device identifier and an orientation identifier by each display device of the array of display devices via the screen mode, wherein the unique device identifier is configured to be used to determine a size of a respective display device, including physical dimensions of at least a display screen of the respective display device, wherein an image depicting the array of display devices is captured by a presentation device executing the presentation application in the presentation mode responsive to selection of the presentation mode from the plurality of selectable modes, wherein the image further depicts the unique device identifier and the orientation identifier of each display device of the array of display devices, wherein the image is captured via a function accessed via the presentation mode, wherein the image is transmitted from the presentation application in the presentation mode to the presentation server via the network, wherein the presentation device and the array of display devices are associated, by the presentation server, with a session identifier corresponding to a collaborative session; and generating and outputting, by a first display device of the array of display devices and without requiring any partition instruction from the presentation server, a partition of the content that is commensurate with an orientation and the size of the first display device, wherein the orientation is determined by the presentation server and based upon the orientation identifier presented by the first display device, and wherein the size is determined by the presentation server and based upon at least one of the registration or the unique device identifier presented by the first display device.

5. The computer-implemented method of claim 4, wherein data linked to the unique device identifier specifies the physical dimensions of at least the display screen of the respective display device.

6. The computer-implemented method of claim 4, wherein the partition is stretched, centered, shifted, or rotated when displayed.

7. A system to display content, the system comprising:

an array of display devices that each executes a presentation application in a screen mode responsive to selection of the screen mode from a plurality of selectable modes including the screen mode and a presentation mode, wherein one or more display devices of the array of display devices participated in registration via a presentation server over a network; and a presentation device executing the presentation application in a presentation mode responsive to selection of the presentation mode from the plurality of selectable modes, wherein the application in the presentation mode is configured to capture an image depicting the array of display devices, wherein the image further depicts a unique device identifier and an orientation identifier presented by each display device of the array of display devices via the screen mode, wherein the image is captured via a function accessed via the presentation mode, and wherein the image is transmitted from the presentation application in the presentation mode to the presentation server via the network;

wherein the presentation device and the array of display devices are associated, by the presentation server, with a session identifier corresponding to a collaborative session;

wherein a first display device of the array of display devices is configured to generate and output a first partition of the content based upon a relative position, an orientation, and a size of the first display device and without requiring any partition instruction from the presentation server;

wherein the orientation is determined by the presentation server based upon the orientation identifier presented by the first display device, and wherein the size of the first display device is determined by the presentation server based upon an identity of the first display device;

wherein the identity of the first display device is determined based upon at least one of the registration or the unique identifier presented by the first display device, and wherein the identity of the first display device is correlated with data indicative of physical dimensions of at least a display screen of the first display device.

8. The system of claim 7, wherein the relative position is determined by the presentation server and based upon the image.

9. The computer-implemented method of claim 1, wherein the partition is stretched, centered, shifted, or rotated when displayed.

10. The computer-implemented method of claim 1, wherein the presentation device and each display device comprises a respective mobile device.

11. The computer-implemented method of claim 4, wherein the presentation device and each display device comprises a respective mobile device.

12. The system of claim 7, wherein the partition is stretched, centered, shifted, or rotated when displayed.

13. The system of claim 7, wherein the presentation device and each display device comprises a respective mobile device.

14. The computer-implemented method of claim 1, wherein the content is specified via the presentation application in the presentation mode.

15. The computer-implemented method of claim 1, wherein the content comprises video content.

16. The computer-implemented method of claim 4, wherein the content is specified via the presentation application in the presentation mode.

17. The system of claim 7, wherein the content is specified via the presentation application in the presentation mode.

18. The computer-implemented method of claim 1, wherein the presentation application executing on the presentation device is operable in the screen mode upon selection of the screen mode on the presentation device, and wherein the presentation application executing on each display device of the array of display devices is operable in the presentation mode upon selection of the presentation mode on each display device.

19. The computer-implemented method of claim 1, wherein the physical dimensions of at least a display screen of a first display device of the array of display devices is determined based upon the registration.

20. The computer-implemented method of claim 19, wherein the physical dimensions of at least a display screen of a second display device of the array of display devices is determined based upon the unique device identifier.

21. The computer-implemented method of claim 1, wherein the collaborative session comprises a cloud-based collaborative session, wherein the presentation device and the array of display devices are associated with the session identifier upon determining that the presentation device and the array of display devices are engaged in the cloud-based collaborative session, and wherein the presentation server is configured to:

upon determining that the presentation device and the array of display devices are not engaged in any cloud-based collaborative session, generate and transmit a second partition of the content to the presentation application executing in the screen mode on a second display device of the array of display devices, wherein the second partition is generated based upon the relative position, the orientation, and the size of the second display device.

22. The computer-implemented method of claim 21, wherein the presentation server is further configured to:

upon determining that the presentation device and the array of display devices are not engaged in any cloud-based collaborative session, generate and transmit a partition instruction to the presentation application executing in the screen mode on a third display device of the array of display devices, wherein the partition instruction is generated based upon the relative position, the orientation, and the size of the third display device, and wherein the third display device is configured to generate a third partition of the content based upon the partition instruction.

* * * * *